March 31, 1936.    S. E. BOUCHARD    2,035,785
OPHTHALMIC MOUNTING
Filed March 17, 1934
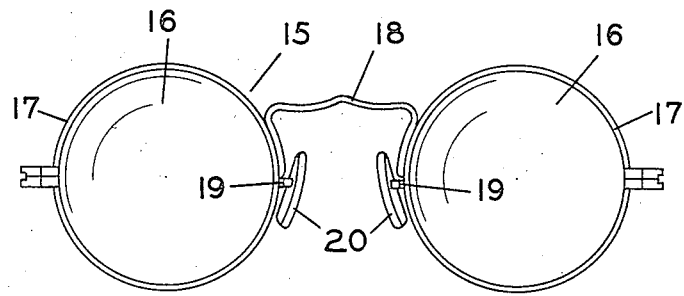
FIG. 1
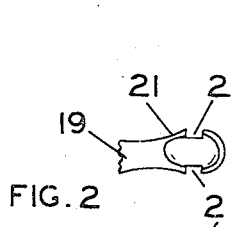
FIG. 2
FIG. 3
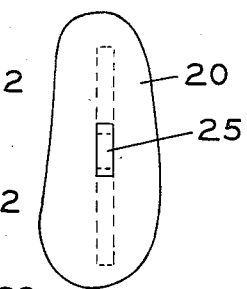
FIG. 4
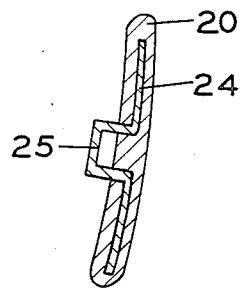
FIG. 5
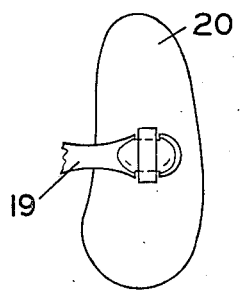
FIG. 6
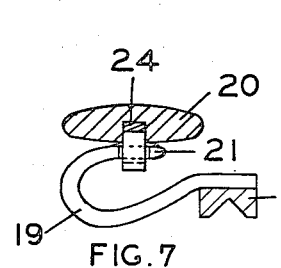
FIG. 7
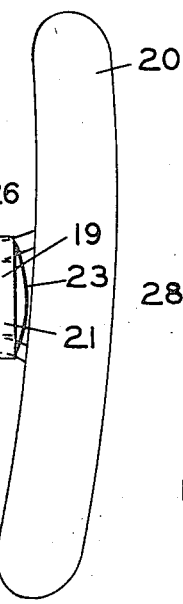
FIG. 8
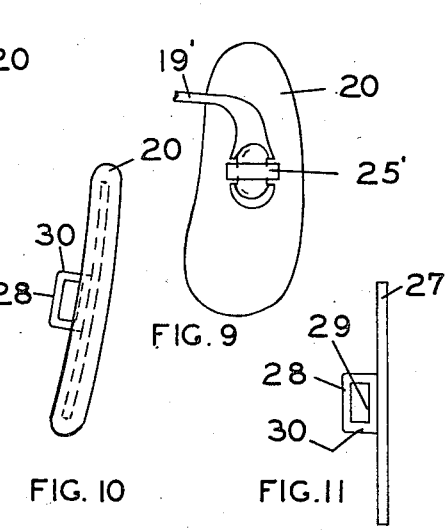
FIG. 9
FIG. 10
FIG. 11
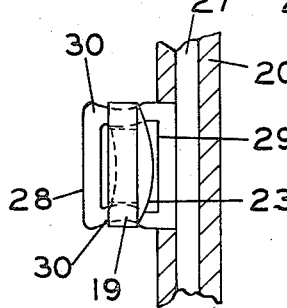
FIG. 12
SAMUEL E. BOUCHARD
INVENTOR
BY *[signature]*
ATTORNEY Patented Mar. 31, 1936

2,035,785

UNITED STATES PATENT OFFICE 2,035,785

OPHTHALMIC MOUNTING

Samuel E. Bouchard, Rochester, N. Y., assignor to Bausch & Lomb Optical Company, Rochester, N. Y., a corporation of New York Application March 17, 1934, Serial No. 716,142

4 Claims. (Cl. 88—49)

This invention relates to ophthalmic mountings and more particularly it has reference to nose engaging members or pads.

One of the objects of my invention is to provide an improved nose engaging member. Another object is to provide improved means for securing a nose pad to the arm which is attached to the lens holding means whereby the pad will be rockably supported and adapted to be readily removed or detached from the arm. Other objects and advantages reside in certain novel features of construction, arrangement and combination of parts as will hereinafter be more fully described and pointed out in the appended claims.

Referring to the drawing:

Fig. 1 is a front view of a spectacle frame embodying my invention.

Fig. 2 is a view of the end of the arm which carries the nose pad.

Fig. 3 is a side view thereof.

Fig. 4 is a rear view of a nose pad embodying my invention.

Fig. 5 is a vertical sectional view of same.

Fig. 6 shows the pad mounted on the arm.

Fig. 7 is a horizontal sectional view of the pad.

Fig. 8 is an enlarged view showing the pad mounted on the arm.

Fig. 9 shows a modified type of arm and pad.

Fig. 10 shows another type of pad.

Fig. 11 is a view of the loop member used in making the pad of Fig. 10.

Fig. 12 is an enlarged fragmentary view showing the method of supporting the pad of Fig. 10 on the arm.

One preferred embodiment is shown in the drawing wherein 15 indicates a pair of spectacles comprising lenses 16 mounted in rims 17 which are connected by bridge 18. Secured to each rim 17 is a rearwardly extending arm 19 on which is mounted a pad 20. The end 21 of arm 19 is provided with two notches or re-entrant portions 22 and one face of the arm 19 is provided with a convex portion 23 for a purpose to be hereinafter described.

The pad 20 may be formed of a non-metallic material such as zylonite or any other material which may be molded or cemented. The pad 20 may be formed in a single piece by molding or the pad may be built up of two superposed pieces of non-metallic material which are cemented together. In either case, the pad has a metallic insert member 24 provided with a substantially rectangular loop portion 25 which projects from the rear face of pad 20. The pad is mounted on arm 19 by inserting the end of the arm in the loop 25 and then bending inwardly the sides 26 of the loop 25 so that they are positioned within the re-entrant portions 22 on the end of the arm as shown in Fig. 8. The pad is thereby secured to the arm and is adapted to rock in vertical and horizontal planes with the convex surface 23 contacting with the rear face of the pad. The amount of rocking movement of the pad can be controlled by the depth and width of notches 22 and by the amount the sides 26 are bent inwardly. The pad can be adjustably positioned by bending the arm 19 in the usual manner. In Fig. 9 I have shown a modification wherein the arm 19' has a downwardly extending end portion carrying the pad 20 so that the loop 25' is positioned in a horizontal instead of in a vertical plane.

Another modification, shown in Fig. 10, is made by placing the insert 27 of Fig. 11 within the non-metallic body of pad 20. The insert 27 comprises a flat strip of metal having a substantially rectangular closed loop portion 28. The loop 28 may, for example, be soldered to the strip 27. When this insert is placed within the non-metallic body, either made up of two cemented parts or an integral molded body, the loop 28 projects from the rear face of the pad 20 with the side 29 of loop 28 practically flush with rear surface of the pad. The pad is secured to arm 19 by bending inwardly the sides 30 of loop 28 as shown in Fig. 12. This permits the pad to rock on the arm and the convex portion 23 of the arm contacts with the side 29 of loop 28 so there is a metal to metal contact which will reduce wear of the parts.

From the foregoing, it will be apparent that I am able to attain the objects of my invention and provide an improved nose pad and means for attaching same to an ophthalmic mounting. The pad may be easily attached to the arm by the optician and in case of needed repairs the old pad can be removed by cutting loop 25 or 25' and a new pad can then be attached to the arm. The pad is adapted to rock on the arm so as to adjust itself to the nose of the wearer. The convex face of arm 19 affords a rocking bearing for the pad and in the modification of Figs. 10 and 12 the convex face bears on metal. By using a loop I am able to provide a strong, durable means for rockably mounting the pad on the arm as the sides of the loop which are inwardly bent are connected so as to afford rigidity. In the modification of Fig. 5 the sides of the loop are connected by one piece of material while in the modification of Figs. 10 and 12 the sides 30 are connected by two portions of material since a completely closed rectangular metallic loop 28 is employed. Various modifications can obviously be made without departing from the spirit of my invention.

I claim:

1. In an ophthalmic mounting, the combination of lens holding means, an arm extending rearwardly from said means, said arm having a narrow neck portion adjacent to its free end, a nose engaging member having a closed integrally formed loop portion having inwardly bent side walls, said member being mounted on said arm with the side walls of said loop loosely positioned within the narrow neck portion, said arm having a convex portion engaging the rear surface of said member.

2. In an ophthalmic mounting, the combination of lens holding means, an arm extending rearwardly from said means, said arm having a narrow neck portion adjacent to its free end, a nose engaging member having a closed integrally formed loop portion having inwardly bent side walls, said member being mounted on said arm with the side walls of said loop loosely positioned within the narrow neck portion.

3. In an ophthalmic mounting the combination of a non-metallic nose engaging member, a metallic insert embedded therein, a permanently closed, preformed metallic loop secured to said insert and extending outwardly from said member, a supporting arm having a narrow neck portion loosely positioned within said loop, the side walls of said loop being bent inwardly to prevent the removal of the narrow neck portion of said arm from said loop, a lens holding means and means for securing said supporting arm to said lens holding means.

4. In an ophthalmic mounting the combination of lens holding means, an arm extending rearwardly from said means, said arm having a reduced neck portion adjacent its free end, a flat, non-metallic nose engaging member, a metallic insert embedded therein, and a permanently closed, substantially rectangular metallic loop having flat ends and inwardly bent side walls secured to said insert, the inside surface of one end of said loop being flush with one surface of said nose engaging member, said member being mounted on said arm with the side walls of said loop loosely positioned within said narrow neck portion.

SAMUEL E. BOUCHARD.